Oct. 27, 1925.
J. ROGERS
CHART HOLDER AND FINDER
Filed Feb. 2, 1923
1,559,459
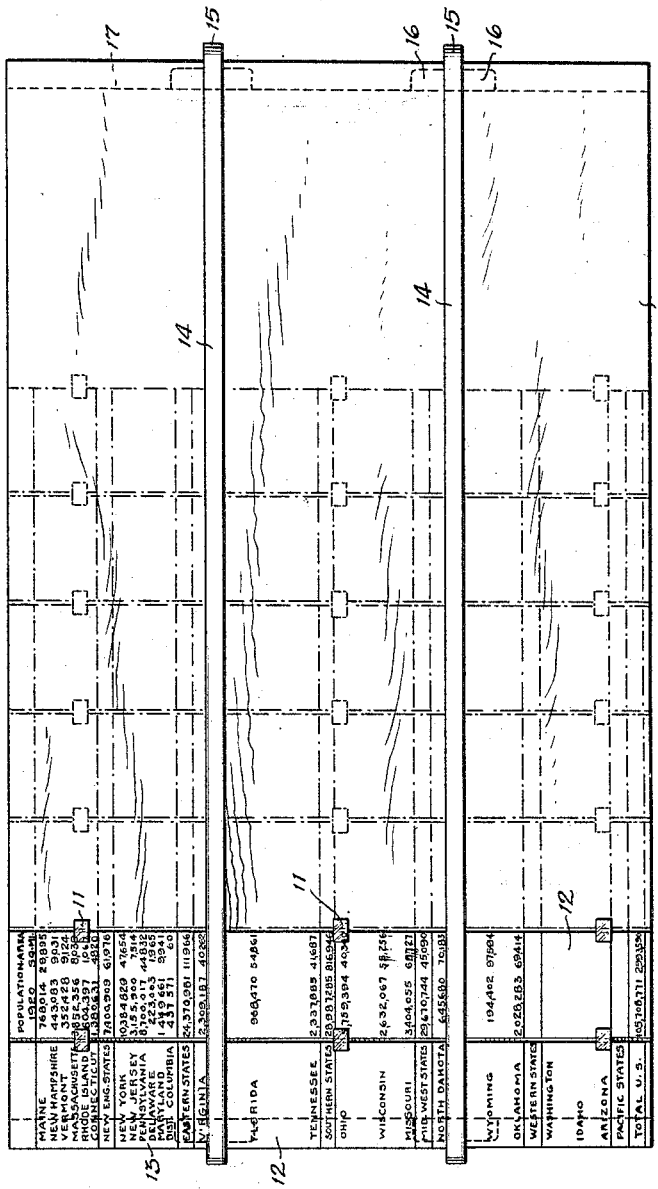
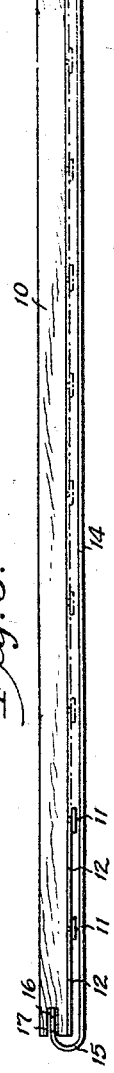
INVENTOR
Jason Rogers
BY
ATTORNEYS
WITNESSES Patented Oct. 27, 1925.

1,559,459

UNITED STATES PATENT OFFICE.

JASON ROGERS, OF NEW ROCHELLE, NEW YORK, ASSIGNOR TO THE ADVERTISERS' WEEKLY, INC., OF NEW ROCHELLE, NEW YORK, A CORPORATION OF NEW YORK.

CHART HOLDER AND FINDER.

Application filed February 2, 1923. Serial No. 616,539.

*To all whom it may concern:*

Be it known that I, JASON ROGERS, a citizen of the United States, and a resident of New Rochelle, in the county of Westchester and State of New York, have invented a new and Improved Chart Holder and Finder, of which the following is a full, clear, and exact description.

This invention has relation to an improved chart for the presentation of facts relating to industry, economics, statistics or the like, and aims for its principal object to provide an apparatus for facilitating the tabulation and reading of column indicia.

As a further object the invention contemplates an apparatus in which a number of strips having a column or columns of indicia inscribed thereon, may be associated to correlate the same whereby readings and comparisons may be rapidly made.

As a still further object the invention contemplates an apparatus of the character described which is extremely simple in its construction and mode of use, inexpensive to manufacture, and which is highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawing—

Figure 1 is a plan view of the apparatus illustrating the use of the same.

Fig. 2 is an end view of the same.

Fig. 3 is a plan view thereof.

Referring to the drawing by characters of reference, 10 designates a substantially rectangular base which is preferably constructed of wood or any other suitable material which will constitute an anchor for the thumb tacks 11 which are employed for the purpose of associating the chart strips 12 with the base. The strips 12 have inscribed thereon suitable indicia 13 relating to statistics, economics, industry or the like, which indicia is arranged in a column or columns on each strip. The thumb tacks 11 are preferably provided with transparent heads and their shanks or pins are inserted in the base 11 and lie between the edges of adjacent strips 12. When the strips are arranged in side by side relation on the base 10 to constitute a chart, a finder means constituting a part of of the apparatus is employed for lining up the transverse rows of the strip columns. The finder means consists of bars 14 which have their opposite extremities turned inwardly as at 15 and provided with lateral projections 16 which are received by grooves 17 in the opposite ends of the base to maintain the bars 14 at a true right angle with the strips and columns and at the same time permit of sliding movement of the bars. Under this arrangement one or more bars associated with the base may be used to read the corresponding transversely aligned indicia of the charts or a comparison of two or more transverse rows of indicia.

I claim:

1. An apparatus of the character described comprising a base, strips having columned indicia inscribed thereon, means for associating the strips in a side by side arrangement on the base, a finder means slidably connected with the base and extending transversely across the strips, said finder means comprising a bar having inturned opposite extremities, a grooved portion formed in the ends of the base in which said inturned extremities are fitted, and means on said inturned ends for coacting engagement with the grooved portions to maintain the bars at a right angle to the strips.

2. An apparatus of the character described comprising a base, strips having columned indicia inscribed thereon, means for associating the strips in a side by side arrangement on the base, a finder means slidably connected with the base and extending transversely across the strips, said finder means comprising a bar having inturned opposite extremities, a grooved portion formed in the ends of the base in which said inturned extremities are fitted, and means on said inturned ends for coacting engagement with the grooved portions to maintain the bars at a right angle to the strips, said latter means comprising lateral elongated projections on the inturned ends coacting with the innermost walls of the grooved portions.

JASON ROGERS.